United States Patent

Mahler

(10) Patent No.: US 9,819,651 B2
(45) Date of Patent: Nov. 14, 2017

(54) SECURE VOICE AND TEXT COMMUNICATION

(71) Applicant: Paul Steven Mahler, San Jose, CA (US)

(72) Inventor: Paul Steven Mahler, San Jose, CA (US)

(73) Assignee: Voice Carrier, San Jose, CA (US)

(*) Notice: Subject to any disclaimer, the term of this patent is extended or adjusted under 35 U.S.C. 154(b) by 88 days.

(21) Appl. No.: 14/805,995

(22) Filed: Jul. 22, 2015

(65) Prior Publication Data

US 2017/0026344 A1    Jan. 26, 2017

(51) Int. Cl.
*H04L 29/06* (2006.01)
*G10L 17/22* (2013.01)
*H04L 9/14* (2006.01)

(52) U.S. Cl.
CPC ............ *H04L 63/0428* (2013.01); *H04L 9/14* (2013.01); *H04L 63/061* (2013.01); *G10L 17/22* (2013.01)

(58) Field of Classification Search
CPC ..... H04L 63/0428; H04L 9/14; H04L 63/061; G10L 17/22
USPC .......................................................... 713/168
See application file for complete search history.

(56) References Cited

U.S. PATENT DOCUMENTS

| | | | | |
|---|---|---|---|---|
| 5,222,136 A | * | 6/1993 | Rasmussen | ........... H04L 9/0625 380/266 |
| 5,410,599 A | * | 4/1995 | Crowley | .................. H04K 1/00 380/243 |

OTHER PUBLICATIONS

F. Monrose, M. K. Reiter, Q. Li, S. Wetzel, "Using voice to generate cryptographic keys", Proc. Odyssey 2001, pp. 237-242, 2001.*

* cited by examiner

*Primary Examiner* — Kambiz Zand
*Assistant Examiner* — Benjamin Kaplan
(74) *Attorney, Agent, or Firm* — Donald R. Boys; Central Coast Patent Agency, Inc.

(57) ABSTRACT

A computerized security peripheral device has a central processing unit (CPU), a power supply, a digital memory; a microphone; a speaker apparatus; first circuitry enabling wireless data transfer to and from a communication device having compatible wireless communication capability; and second circuitry executing coded instructions enabling encryption of audio input at the microphone and decryption of incoming encrypted voice data using one or more keys stored in the digital memory. The audio input at the microphone is converted to an audio data stream that is encrypted using the one or more keys, and then is provided as an encrypted stream through the first circuitry to the network-connected communication device, and wherein encrypted voice data received at the first circuitry is decrypted using the one or more keys, and the decrypted data is provided as voice date to the speaker apparatus.

15 Claims, 6 Drawing Sheets

```
Apple
Oranges
515150
3490763
bacarac
tableleg
Paris

Key kist 1-Copy 1
```

```
Apple
Oranges
515150
3490763
bacarac
tableleg
Paris

Key kist 1-Copy 2
```

*Fig. 6*

SECURE VOICE AND TEXT COMMUNICATION

CROSS-REFERENCE TO RELATED DOCUMENTS

The present application claims priority to U.S. provisional application No. 62/145,297, filed Apr. 9, 2015, which is incorporated herein in its entirety, at least by reference.

BACKGROUND OF THE INVENTION

1. Field of the Invention

The present invention is in the technical area of telephonic communication, and pertains in particular to apparatus and methods for assuring privacy and security of communication.

2. Description of Related Art

It is well known in the art that communication between persons using network-connected devices, such as telephones, is far from secure. There are many well-known examples of eavesdropping and recording of personal and business communications, both voice and text. The recent news revelations regarding the National Security Agency (NSA) are a case in point.

It is widely presumed and argued that citizens of the USA and other nations as well have right to privacy in their communications. It is well known, however, that there are many entities, both government and private, that have motivation to secretly access, record and use voice conversations and text exchanges between persons, and between automated systems as well.

A problem in addressing security in networked communication is that typically a message from an initiator to a recipient will traverse a number of networks and computerized servers and systems between send and receive. Opportunities for eavesdropping are many, and systems have been developed that are difficult to detect. The large number of points of access to traveling messages, and the fact that points of access may be controlled by different entities, makes policing such traffic a very difficult undertaking, indeed.

The present inventor has considered the difficulties, and has developed a system that ensures privacy. The resulting invention is described in several different embodiments below with reference to several figures and diagrams.

BRIEF DESCRIPTION OF THE SEVERAL VIEWS OF THE DRAWINGS

FIG. 6 illustrates an exemplary encryption code list in an embodiment of the invention.

BRIEF SUMMARY OF THE INVENTION

Figure 1:
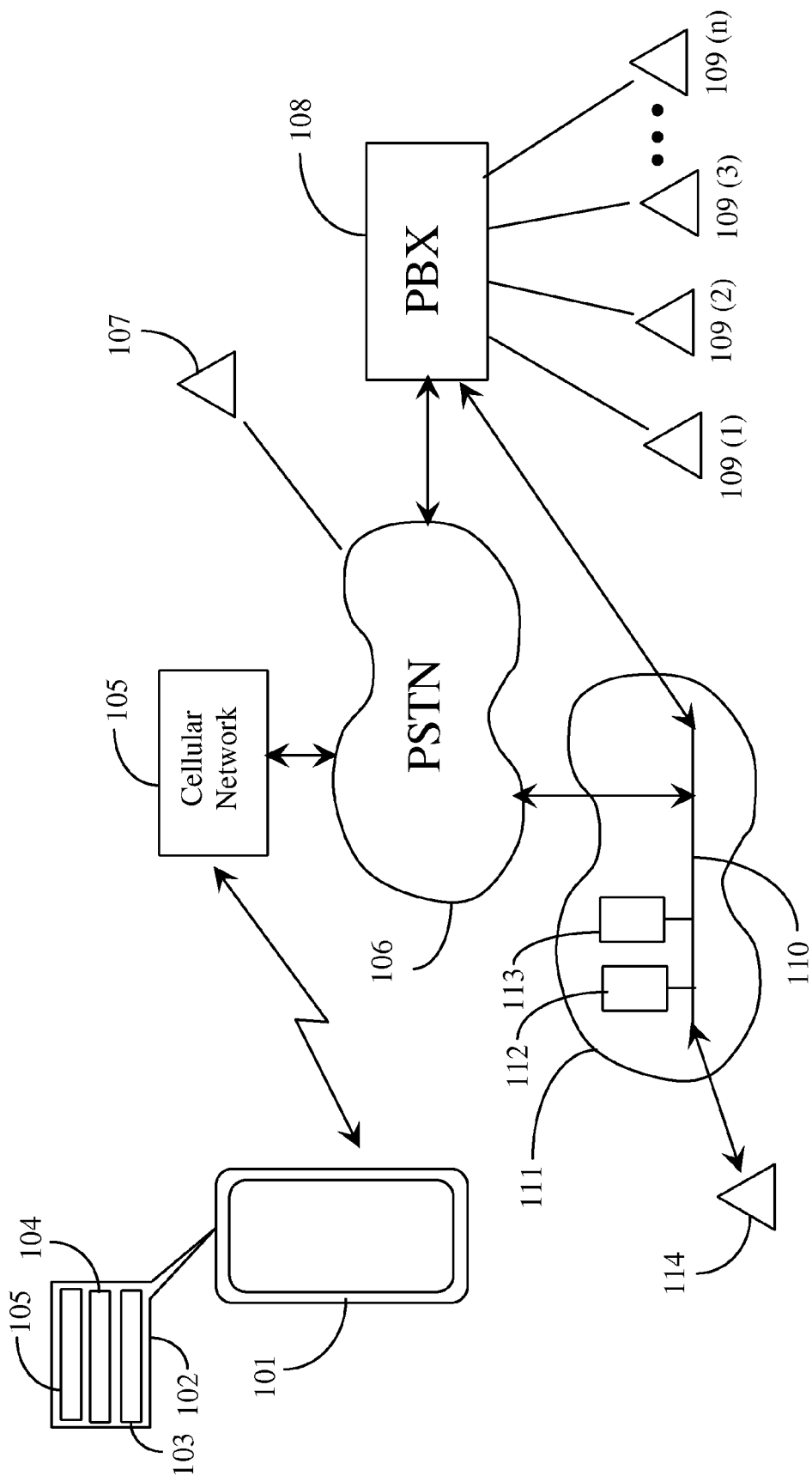
FIG. 1 is an architectural diagram of a modern communication exchange between communication appliances over interconnected networks.

In one embodiment of the invention a computerized security peripheral device is provided, comprising a central processing unit (CPU), a power supply, a digital memory, a microphone, a speaker apparatus, first circuitry enabling wireless data transfer to and from a communication device having compatible wireless communication capability, and second circuitry executing coded instructions enabling encryption of audio input at the microphone and decryption of incoming encrypted voice data using one or more keys stored in the digital memory. Audio input at the microphone is converted to an audio data stream that is encrypted using the one or more keys, and then is provided as an encrypted stream through the first circuitry to the network-connected communication device, and encrypted voice data received at the first circuitry is decrypted using the one or more keys, and the decrypted data is provided as voice date to the speaker apparatus.

In one embodiment the one or more keys are selected from a plurality of encryption keys stored in the digital memory. Also in one embodiment a key is selected from a plurality of stored keys according to identification of an intended recipient of an outgoing call from the network-connected communication device. Also in one embodiment keys are selected by voice recognition of one or more users. And in one embodiment the device further comprises transmitting a decryption key, which may be the same as the encryption key, by the first circuitry prior to the network-connected communication device transmitting encrypted voice data.

In another aspect of the invention a system for secure voice telephony communication is provided, comprising a first computerized peripheral device having a central processing unit (CPU), a power supply, a digital memory, a microphone, a speaker apparatus, first circuitry enabling wireless data transfer, and second circuitry executing coded instructions enabling encryption and decryption of audio input and output using one or more encryption keys stored in the digital memory, a first computerized telephony device wirelessly paired with the first computerized peripheral device, a second computerized peripheral device having a central processing unit (CPU), a power supply, a digital memory, a microphone, a speaker apparatus, first circuitry enabling wireless data transfer, and second circuitry executing coded instructions enabling encryption and decryption of audio input and output using one or more encryption keys stored in the digital memory, and a second computerized telephony device wirelessly paired with the second computerized peripheral device. During a voice communication between the first and the second telephony devices, voice data is encrypted and decrypted in the first and second computerized peripheral devices, such that at any network node between the first and the second telephony devices, voice data is encrypted.

In one embodiment of the system the one or more keys are selected from a plurality of encryption keys stored in the digital memory. Also in one embodiment a key is selected from a plurality of stored keys according to identification of an intended recipient of an outgoing call from the network-connected communication device. Also in one embodiment keys are selected by voice recognition of one or more users. And in one embodiment the system further comprises transmitting a decryption key, which may be the same as the encryption key, by the first circuitry prior to the network-connected communication device transmitting encrypted voice data.

In yet another aspect of the invention a method is provided, comprising receiving, by a peripheral device having a central processing unit (CPU), a power supply, a digital memory, a microphone, a speaker apparatus, first circuitry enabling wireless data transfer to and from a telephony device having compatible wireless communication capability, and second circuitry executing coded instructions enabling encryption of audio input at the microphone and decryption of incoming encrypted voice data using one or more keys stored in the digital memory, either encrypted voice data by wireless reception, or voice via the microphone, in the case of encrypted voice data, decrypting the data using a stored key and providing the resulting decrypted voice data to the speaker apparatus, or in the case of unencrypted voice data received at the microphone, encrypting the voice data using the one or more keys, then providing the encrypted voice data by wireless transmission to the telephony device.

In one embodiment of the method the one or more keys are selected from a plurality of encryption keys stored in the digital memory. Also in one embodiment a key is selected from a plurality of stored keys according to identification of an intended recipient of an outgoing call from the network-connected communication device. In one embodiment keys are selected by voice recognition of one or more users. And in one embodiment the method further comprises transmitting a decryption key, which may be the same as the encryption key, by the first circuitry prior to the network-connected communication device transmitting encrypted voice data.

DETAILED DESCRIPTION OF THE INVENTION

FIG. 1 is an architectural diagram of a modern communication exchange between communication appliances over interconnected networks. A mobile telephone 101 is represented with a balloon 102 illustrating layers of control typical to a mobile telephone. A base layer 103 represents hardware connections and firmware built into the telephone by the manufacturer, most of which is not accessible, alterable or programmable by an end user. A software-enabled operating system 104 is represented, and is the operating system through which applications and other functionality is accomplished. In Apple™ products this OS is iOS. In many other mobile devices this OS may be Android. Layer 105 represents various applications that are callable and may execute on the mobile telephone by virtue of operating system 104.

Mobile telephone 101 is shown in radio connection with a cellular network 105 which may comprise local cell towers receiving and transmitting radio signals between devices like device 101 and the base stations of the cell network, where administrative functions may be performed, such as, for example, tracking the geographic location of device 101 as the user of the device travels.

Cellular network 105 is exemplary, and the skilled person will recognize that there are many variations in hardware, architecture, software and functionality among known cellular networks. Cellular network 105 is shown connected in this example to a Public Switched Telephone Network (PSTN) 106, which represents all of the well-known land-line telephone systems in various locations. A land-line telephone device 107 is shown connected to PSTN 106, and voice calls may be switched between telephone 101 and telephone 107, with data streaming through each of the end devices, various servers in the cellular network where data will be translated through gateways to be exchanged with the PSTN, through switches and other equipment in the PSTN, and through various nodes and substations between the PSTN central switches and the end device 107. Each of many points in the data path may be a point that may be compromised by an entity that wishes to record communications and compromise security in the communication pathways.

PSTN 106 is also shown connected to a Private Branch Exchange (PBX) system 108, which may be by land-line telephone trunks. Such a PBX may be operable in an enterprise, such as a private business or government offices for example. Typically a plurality of internal telephone devices, such as devices 109(1) to 109(n) may be connected by Destination Number (DN) connections within an enterprise administered by such a PBX. The skilled person will recognize that there are a variety of PBX systems known in the art. The equipment in the PBX, the internal phone connections, and software executing in the PBX are all opportunistic places for compromising security in a communication.

PSTN 106 has connection to a data network 111, in this example, a segment of the Internet network. Network 111 includes a network backbone 110. Computing appliances 112 and 113 may be servers representing stops for data traveling over the network. Servers 112 and 113 are connected by Internet access line to backbone 110. An Internet-connected communications end device 114 may communicate over the connected networks using a telephony application executed and running on the device, like Skype for example. The skilled person will realize that there are various other Voice-over-IP (VOiP) systems available for audio and text communication through the Internet and sub networks to the Internet. Points on the data network such as routers or servers where data pauses represent points that might be compromised as described further above.

Figure 2:
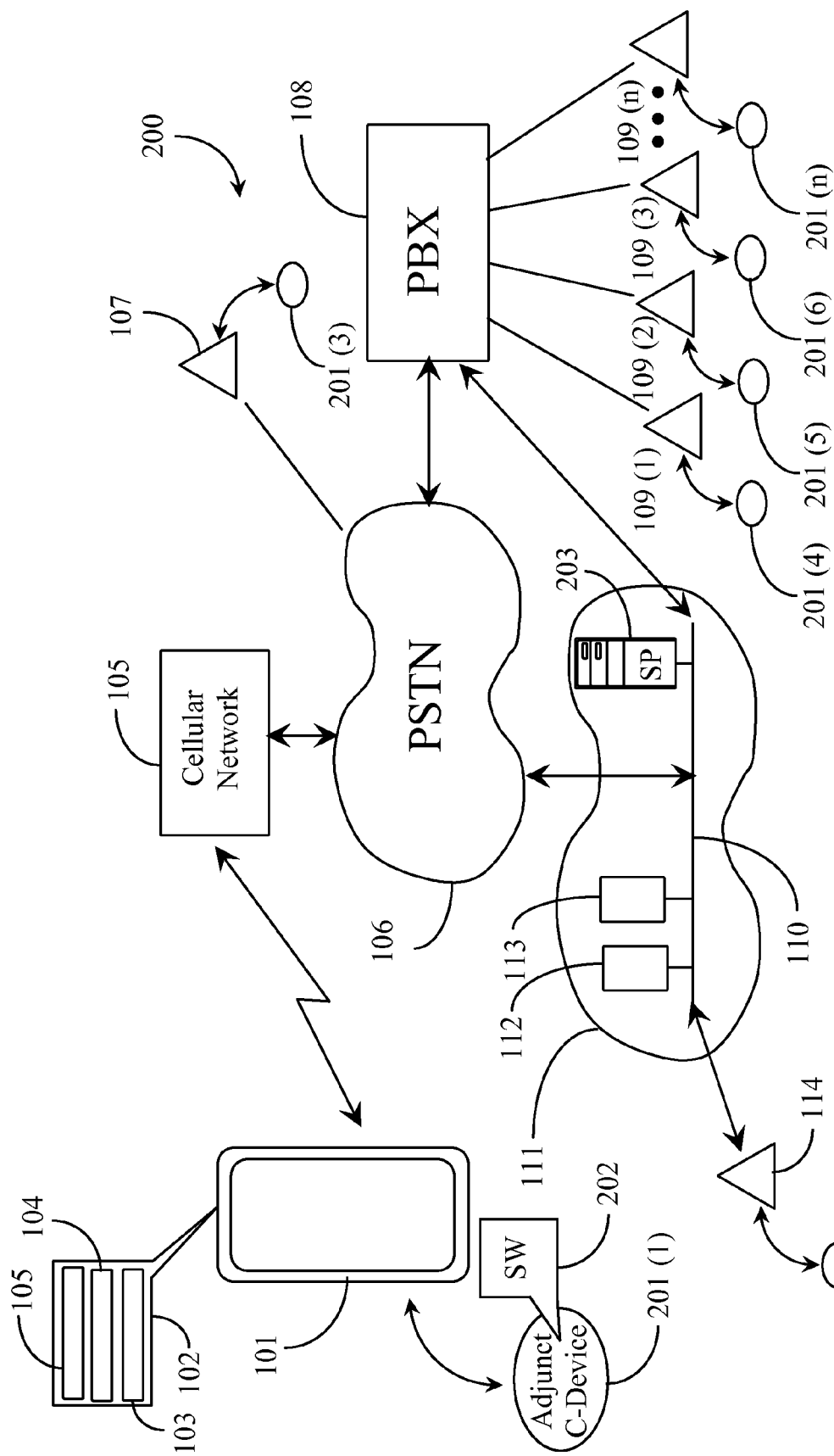
FIG. 2 is an architectural diagram of the appliances and connected networks of FIG. additionally depicting apparatus and connectivity in an embodiment of the present invention.

FIG. 2 is an architectural diagram of the appliances and connected networks of FIG. 1 additionally depicting apparatus and connectivity in an embodiment of the present invention. Communications network 200 includes all of the network segments of FIG. 1 including Internet 110, PSTN 106, PBX 108, and Cellular network 105.

In this example, an adjunct peripheral communications device 201 (1) is provided that communicates wirelessly with phone 101 similar to a wireless headset or ear piece. Similarly, adjunct peripherals 201 (2-*n*) are depicted coupled to host communications devices 114, 107, and 109 (1-*n*). In one embodiment adjunct peripheral 201 (1) is a Bluetooth head piece or ear piece modified with the addition of certain unique components and code to practice the present invention. More particularly, each adjunct peripheral 201(1-*n*) is enabled to encrypt and decrypt text and voice data more particularly so that data transferred through host nodes and the overall network remains encrypted in transit and at rest on any network node.

Adjunct peripherals 201(1-*n*) may be Bluetooth™ earpieces or headsets. Other examples of such peripherals exist for other types of communications appliances. One uses such peripheral devices for hands-free communications. The peripheral devices are tethered or coupled to the host communications device for example, telephone 101 via wireless or wired connection. Adjunct peripherals 201 (1-*n*) may not be exactly the same device in every instance or embodiment. Each device may be customized to its host device constraints and network constraints relative to the type of communications network to which the host device is connected. For example, adjunct peripheral 201 (1) has a digital host connected to a digital network whereas adjunct peripheral 201 (3) has a host (land line phone) connected to the PSTN network. Therefore some differences may exist in SW and hardware configurations of the adjunct peripherals.

Adjunct peripheral 201 (1) has a software (SW) application (or firmware) 202 resident thereon and executable therefrom that functions to encrypt input voice for transfer out over the network and to decrypt voice data incoming to the device from the network. An end user such as one operating cell phone 101 with adjunct peripheral 201(1) may call another end user such as PBX phone 109 (*n*) having adjunct peripheral 201 (*n*). The calling party may speak into a microphone on the adjunct peripheral and the spoken data may be encrypted on the device before being transmitted to device 101. The transmitted data remains in the same state of encryption throughout all nodes on the network including the end host node devices like cell phone 101. A recipient uses the adjunct peripheral to decrypt voice data coming from the network.

In one embodiment of the invention the data encryption/decryption code operating as at least a part of SW 202 generates a one-time decryption key for a communications session of two or more parties. The decryption key for a session may be delivered to the call recipient ahead of voice data as text data or as a token using a different path so as not to be retrievable with the voice data from any point in the network. In one embodiment this may accompany other security regimens like two factor authentication, etc. A single decryption key may decrypt the voice data of a single individual in the communications session.

In one embodiment a decryption key is unique to the voice of a user such that the key is reusable when the same person calls again. A user may, in one embodiment, create a decryption key that is constant and that may be used to decrypt voice data from that user in a session or over multiple sessions. In one embodiment a decryption key may have a time to live (TTL) such that if it expires a new decryption key must be generated for a new encryption algorithm. In one embodiment such as with PBX phones 109 (1-*n*), encryption-decryption capabilities might be selectively used during a conference call with multiple outside users attending the call. For example, encrypted communications may take place between two investors that are party to the call, so other parties cannot record what they are saying to one another while no encryption exists for the other parties.

In this example, Internet backbone 110 supports a server 203. Server 203 may be hosted by a service provider (SP) entity that may include a Web site for users to register and tools to help users to find other users and build contact networks. The service would not monitor or otherwise broker communications but may be available to help with software updates, technical issues, and so on. In one embodiment application layer 105 on phone 101 includes an application .exe that, when executed, will automatically set up an adjunct peripheral device such as device 201 (1) for encrypted communications including transferring thereto the SW required to encrypt and decrypt data.

Figure 3:
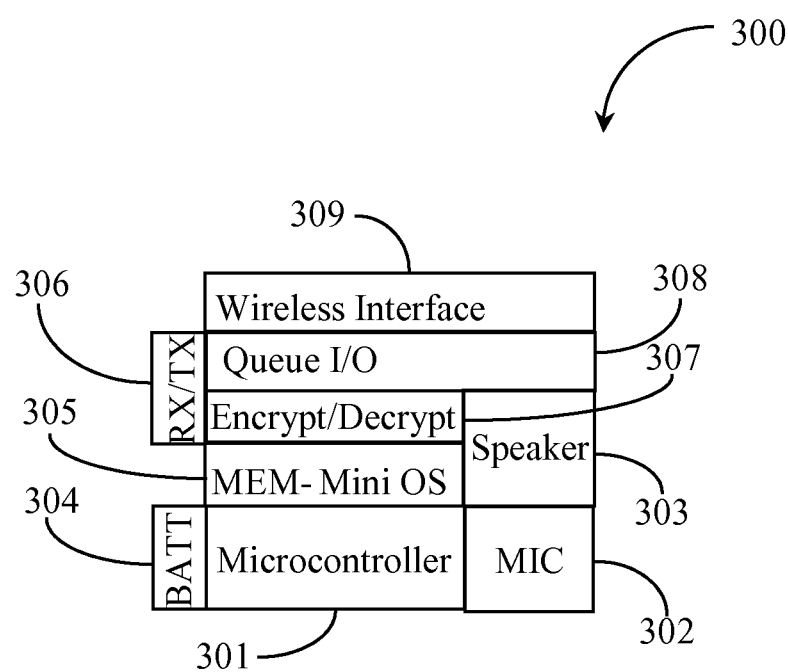
FIG. 3 is a block diagram of an adjunct peripheral device according to an embodiment of the present invention.

FIG. 3 is a block diagram of an adjunct peripheral device 300 according to an embodiment of the present invention. Adjunct peripheral device 300 may represent one of devices 201 (1-*n*) of FIG. 1. In this embodiment device 300 includes components that are present such as in a Bluetooth enabled headset. For example, device 300 includes a microcontroller 301 and a battery (BATT) 304. Device 300 also includes a microphone 302 and a speaker enabling hands-free communication. Device 300 further includes a wireless interface 309 and a receiver (RX) transceiver (TX) 306. In one embodiment wireless interface 309 may be a wired interface instead.

In an embodiment of the invention, device 300 includes a memory (MEM) and mini-operating system 305. In this embodiment the device further includes encryption/decryption software 307. In one embodiment there is no formal operating system, rather a firmware system for supporting the encryption/decryption process. In one embodiment device 300 includes an in/out (I/O) queue or buffer memory for buffering incoming voice for decryption and output over speaker system 303. In the case of a mini OS, there may be selectable indicia on the headset hardware enabling a user to, for example, set an encryption level, do a voice encryption test, select TTL criteria for decryption keys, frequency of new key creation, etc. In this embodiment there may be other SW on the host device that administers, for example, a contact list and access to Web-based help with service or product issues.

In one embodiment of the invention, voice may be translated, encrypted and decrypted at the other end and fed to a voice synthesizer for voice recreation from decrypted text. In one embodiment the voice data is garbled using the encryption program and buffered at the other end for decryption and output of the decrypted voice of the caller. In one embodiment an adjunct peripheral such as peripheral 300 may be shared by more than one user so that there may be several different identifiable profiles on the same device. A user might speak into the microphone with the SW running to have the correct profile activated for communications engaged in by that user operating the adjunct peripheral.

Figure 4:
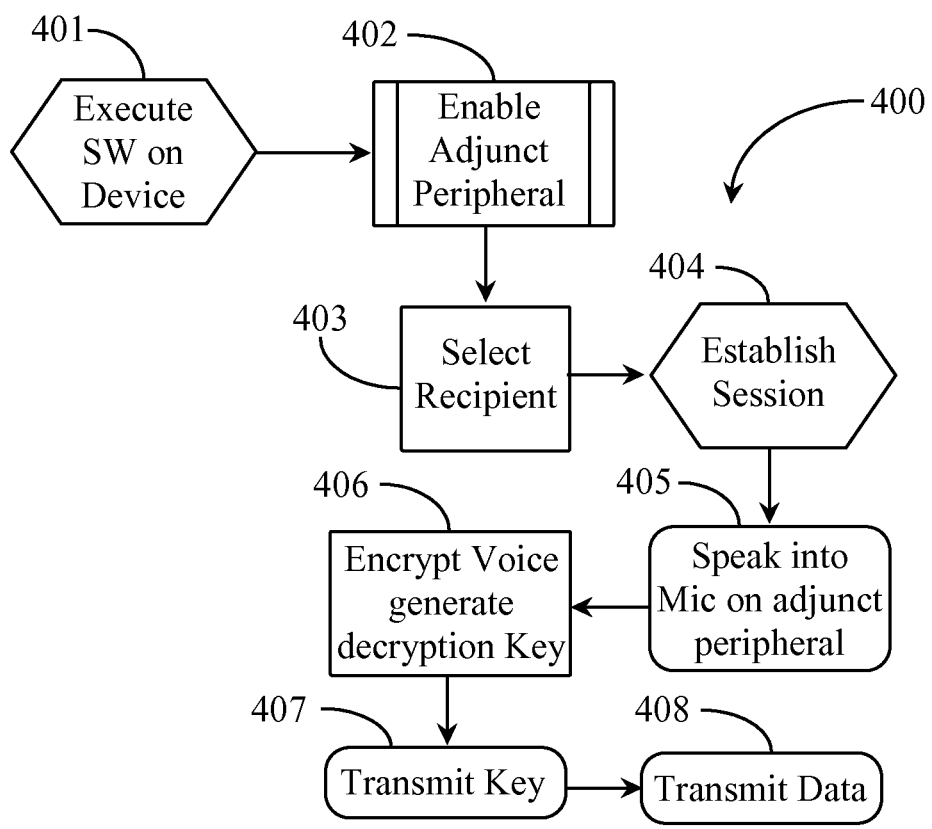
FIG. 4 is a process flow chart depicting steps for placing a secure call according to an embodiment of the present invention.

FIG. 4 is a process flow chart 400 depicting steps for placing a secure call according to an embodiment of the present invention. At step 401 a user may execute a software (.exe) file on a communications appliance such as cell phone 101 of FIG. 1. In one embodiment the communications appliance is already on and connected to a network for communication and an adjunct peripheral device such as adjunct device 201(1) is active and listening over the network. In this example a user may enable the adjunct peripheral device from the host communications appliance through manual selection.

It is assumed in this process flow that the user intends to make a secure telephone call to a recipient over the network. At step 403, the user may select a recipient for the pending call attempt from a contact list on the host appliance. At step 404 the user places the call and a communications session is established in step 404. Step 404 involves the process of setting up the call performed on the network in typical fashion. The call legs may be set up using session initiation protocol (SIP) and VoIP, or other known communications session protocols.

At step 405 the calling party (user) speaks into the microphone on the adjunct peripheral when the session is live. The user will hear the decrypted voice of the recipient when the recipient answers the call. The adjunct peripheral may be as far away from the host appliance as the wireless application or link allows. The adjunct peripheral may be user-worn such as a headset or ear piece. In one embodiment the adjunct peripheral is a desktop apparatus.

In step 406 SW on the adjunct peripheral device encrypts the user's voice and generates or assigns a decryption key. The decryption key may be a text key or token sent to the recipient via a different path than the voice data. The voice data is sent to the recipient over the network in step 408. The recipient will have the key on the adjunct peripheral before the voice data arrives. Encrypted voice data may be buffered at the adjunct peripheral if necessary to allow for the decryption process to run smoothly.

Any other user not having a decryption key but party to the voice session will not be able to hear clear voice data but may hear a garbled version. In one embodiment a user who does not have a decryption key but is receiving the encrypted voice data may hear an advertisement or music or beeps during the length of the encrypted voice stream.

Figure 5:
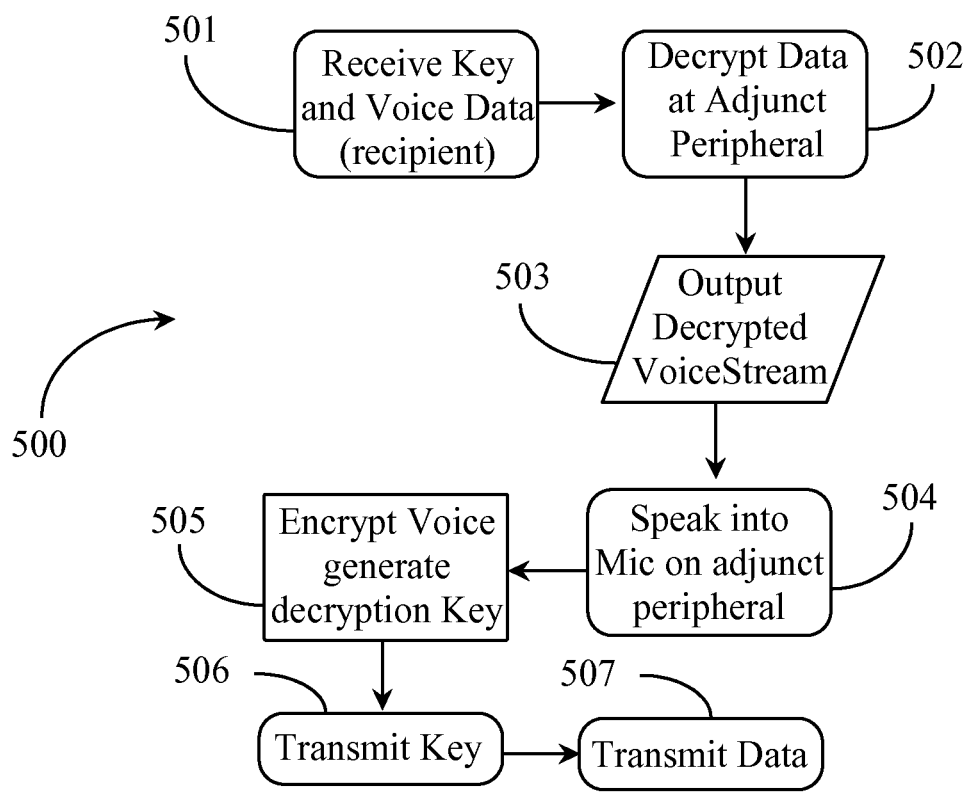
FIG. 5 is a process flow chart depicting steps for receiving encrypted voice data in the communications session of FIG. 4.

FIG. 5 is a process flow chart 500 depicting steps for receiving encrypted voice data in the communications session of FIG. 4. At step 501, a recipient such as a recipient of the call of process 400 may receive a decryption key via text or via separate path from the pending voice data. In one embodiment the decryption keys are exchanged via separate path as part of the call set-up process before voice is spoken. In this case the decryption keys may be unique to each party but reusable to decrypt voice data from that party. The decryption keys may be generated at least in part on the parties' actual voices, which may be used to identify the parties of the session and which of more than one profiled users is operating a particular adjunct peripheral. Step 501 also includes receipt of encrypted voice data over the voice channel established in session set up.

At step 502, encrypted voice data received at an adjunct peripheral is decrypted on the device using the decryption key for that person's voice. At step 503 the decrypted voice is output over the speaker system as a voice stream. In one embodiment voice data decryption of received voice data and encryption of voice data for send may occur simultaneously on the adjunct peripheral during a communication session. Steps 504 through 507 are identical to steps 405 through 408 of FIG. 4. In one embodiment where there is for example more than two connected parties in session, there may be three or more decryption keys exchanged and decryption of more than one parties voice may occur simultaneously on an adjunct peripheral without departing from the spirit and scope of the present invention.

In one embodiment there may be different levels of voice encryption for selection as well as selections for turning security on or off on the adjunct peripheral. In one embodiment where communication is over an analog network, an analog version of encryption and decryption might be provided for an adjunct peripheral wired to a plain old telephone (POT).

In one embodiment a variant of a one-time pad encryption method may be used. In this methodology each participant in a voice communication will have a list of encryption/decryption keys. FIG. 6 illustrates an exemplary list with identical copies 1 and 2. In embodiments facilitating conference calls with more than two parties there will be more copies. In this methodology the use of a key depends on the number and order of calls. Assuming a two-party call, each party has his or her list. This could actually be a page in a notebook, but may be a simple binary file. The first time these parties engage in a call, they encrypt using the first key in the list, and they both destroy that key. Second call, second key, and so on. The encryption key is never transmitted over the communication channel, so the calls are secure.

In a variation of the one-time pad encryption, the list decided between two parties may be shuffled after being completed, with the order of shuffle also a previously agreed-to detail between the parties. In this way a relatively short list is usable for a relatively longer period of time.

In other embodiments of the invention a considerable variety of previously agreed-to procedures might be used for two parties that frequently communicate by voice to establish and alter periodically the encryption/decryption keys that are used between the parties.

In one embodiment There may be a proprietary application (app) executing on, for example, device 101, that determines for each new call setup whether the called party (intended recipient) is one that should have encryption according to an embodiment of the invention. If it is determined at the time of set-up that it is so, then the calling device (101 for example), executing the app., might determine a path, such as text, to the intended recipient, the path different than the path to be used for the voice communication, and might then look for the decryption key from the adjunct peripheral device 201, and transmit that key by the "different" path. There are many possibilities.

It will be apparent to the skilled person that the methods and apparatus taught in embodiments in this specification are examples of broader methods and apparatus that may have altered aspects and elements, but are still suggested by the embodiments described.

The invention claimed is:

1. A computerized security peripheral device, comprising:
a central processing unit (CPU);
a power supply;
a digital memory;
a microphone;
a speaker apparatus;
first circuitry enabling wireless data transfer to and from a communication device having compatible wireless communication capability; and
second circuitry executing coded instructions enabling encryption of audio input at the microphone and decryption of incoming encrypted voice data using one or more keys stored in the digital memory;
wherein audio input at the microphone is converted to an audio data stream that is encrypted using the one or more keys, and then is provided as an encrypted stream through the first circuitry to the network-connected communication device, and wherein encrypted voice data received at the first circuitry is decrypted using the one or more keys, and the decrypted data is provided as voice date to the speaker apparatus.

2. The computerized security peripheral device of claim 1 wherein the one or more keys are selected from a plurality of encryption keys stored in the digital memory.

3. The computerized security peripheral device of claim 2 wherein a key is selected from a plurality of stored keys according to identification of an intended recipient of an outgoing call from the network-connected communication device.

4. The computerized security peripheral device of claim 3 wherein keys are selected by voice recognition of one or more users.

5. The computerized security peripheral device of claim 1 further comprising transmitting a decryption key, which may be the same as the encryption key, by the first circuitry prior to the network-connected communication device transmitting encrypted voice data.

6. A system for secure voice telephony communication comprising:
a first computerized peripheral device having a central processing unit (CPU), a power supply, a digital memory, a microphone, a speaker apparatus, first circuitry enabling wireless data transfer, and second circuitry executing coded instructions enabling encryption and decryption of audio input and output using one or more encryption keys stored in the digital memory;

a first computerized telephony device wirelessly paired with the first computerized peripheral device;

a second computerized peripheral device having a central processing unit (CPU), a power supply, a digital memory, a microphone, a speaker apparatus, first circuitry enabling wireless data transfer, and second circuitry executing coded instructions enabling encryption and decryption of audio input and output using one or more encryption keys stored in the digital memory; and a second computerized telephony device wirelessly paired with the second computerized peripheral device;

wherein during a voice communication between the first and the second telephony devices, voice data is encrypted and decrypted in the first and second computerized peripheral devices, such that at any network node between the first and the second telephony devices, voice data is encrypted.

7. The system of claim 6 wherein the one or more keys are selected from a plurality of encryption keys stored in the digital memory.

8. The system of claim 6 wherein a key is selected from a plurality of stored keys according to identification of an intended recipient of an outgoing call from the network-connected communication device.

9. The system of claim 8 wherein keys are selected by voice recognition of one or more users.

10. The system of claim 6 further comprising transmitting a decryption key, which may be the same as the encryption key, by the first circuitry prior to the network-connected communication device transmitting encrypted voice data.

11. A method, comprising:

receiving, by a peripheral device having a central processing unit (CPU), a power supply, a digital memory, a microphone, a speaker apparatus, first circuitry enabling wireless data transfer to and from a telephony device having compatible wireless communication capability, and second circuitry executing coded instructions enabling encryption of audio input at the microphone and decryption of incoming encrypted voice data using one or more keys stored in the digital memory, either encrypted voice data by wireless reception, or voice via the microphone;

in the case of encrypted voice data, decrypting the data using a stored key and providing the resulting decrypted voice data to the speaker apparatus, or in the case of unencrypted voice data received at the microphone, encrypting the voice data using the one or more keys, then providing the encrypted voice data by wireless transmission to the telephony device.

12. The method of claim 11 wherein the one or more keys are selected from a plurality of encryption keys stored in the digital memory.

13. The method of claim 11 wherein a key is selected from a plurality of stored keys according to identification of an intended recipient of an outgoing call from the network-connected communication device.

14. The method of claim 13 wherein keys are selected by voice recognition of one or more users.

15. The method of claim 11 further comprising transmitting a decryption key, which may be the same as the encryption key, by the first circuitry prior to the network-connected communication device transmitting encrypted voice data.

* * * * *

UNITED STATES PATENT AND TRADEMARK OFFICE
CERTIFICATE OF CORRECTION

PATENT NO. : 9,819,651 B2  
APPLICATION NO. : 14/805995  
DATED : November 14, 2017  
INVENTOR(S) : Paul Steven Mahler Page 1 of 1

It is certified that error appears in the above-identified patent and that said Letters Patent is hereby corrected as shown below:

In Claim 1, in the last line (Column 8 Line 42) the word "date" should be corrected to --data--

Signed and Sealed this  
Sixth Day of March, 2018

Andrei Iancu  
*Director of the United States Patent and Trademark Office*